United States Patent [19]

Gray et al.

[11] Patent Number: 4,848,531
[45] Date of Patent: Jul. 18, 1989

[54] ELECTRONIC SYSTEM FOR MONITORING CLUTCH BRAKE ENGAGEMENT AND CLUTCH SLIPPAGE

[75] Inventors: Larry O. Gray; Wendell C. Lane, Jr., both of Laurinburg, N.C.

[73] Assignee: Dana Corporation, Toledo, Ohio

[21] Appl. No.: 79,734

[22] Filed: Jul. 30, 1987

[51] Int. Cl.4 .............................................. F16D 67/02
[52] U.S. Cl. .............................. 192/13 R; 192/30 W; 74/339
[58] Field of Search ................. 192/12 R, 13 R, 18 R, 192/30 W, 103 R; 74/339

[56] References Cited

U.S. PATENT DOCUMENTS

| | | | |
|---|---|---|---|
| 2,323,489 | 7/1943 | Schmidt et al. | |
| 2,539,534 | 1/1951 | Eckhardt | |
| 2,715,217 | 8/1955 | Russell | |
| 2,863,537 | 12/1958 | Root | 192/18 R X |
| 3,258,092 | 6/1966 | Schiebeler | 192/103 R X |
| 3,465,327 | 9/1969 | Schroter et al. | |
| 3,469,666 | 9/1969 | Goode | |
| 3,809,956 | 5/1974 | Burkel et al. | 192/103 R X |
| 3,834,502 | 9/1974 | Sommer | 192/104 F |
| 3,946,845 | 3/1976 | Kamio | 192/111 A |
| 3,982,614 | 9/1976 | Bisaillon | 192/30 W |
| 4,340,133 | 7/1982 | Blersch | 192/30 W |
| 4,414,533 | 11/1983 | Scott et al. | 340/52 R |
| 4,457,411 | 7/1984 | Hiramatsu | 192/0.076 |
| 4,462,491 | 7/1984 | Kono et al. | 192/103 R X |
| 4,657,124 | 4/1987 | Flotow | 192/13 R |

FOREIGN PATENT DOCUMENTS

| | | |
|---|---|---|
| 906927 | 8/1972 | Canada . |
| 1053794 | 3/1959 | Fed. Rep. of Germany . |
| 2125178 | 11/1972 | Fed. Rep. of Germany ... 192/30 W |
| 2133778 | 1/1973 | Fed. Rep. of Germany ........ 74/339 |
| 2093618 | 9/1982 | United Kingdom ............. 192/30 W |
| 2094923 | 9/1982 | United Kingdom ............ 192/103 R |

Primary Examiner—Rodney H. Bonck
Assistant Examiner—Richard M. Lorence
Attorney, Agent, or Firm—MacMillan, Sobanski & Todd

[57] ABSTRACT

An electronic system for monitoring the operation of a vehicle friction clutch assembly and for generating an indication when the clutch brake of the assembly is frictionally engaged is disclosed. The system generates an electrical signal which is representative of the rotational speed of the clutch brake. To accomplish this, a plurality of magnets or a plurality of radially outwardly extending teeth are secured to the clutch brake. A sensor is disposed near the clutch brake which is responsive to the passage of the magnets and teeth rotating thereby. The sensor generates an electrical pulse train signal having a frequency which is proportional to the rotational speed of the clutch brake. An electronic control circuit is provided for generating an indication when the value of the clutch brake rotational speed signal approaches zero, indicating that the clutch brake is frictionally engaged. A similar sensor be provided for determining the rotational speed of the flywheel of the friction clutch assembly. The control circuit compares the flywheel rotational speed signal with the clutch brake rotational speed signal and generates an indication when the values of the two signals are not equal or when they differ by more than a predetermined amount. Such a situation would occur when there is slippage in the friction clutch assembly which requires maintenance. The flywheel rotational speed signal can also be displayed separately as an analog or digital representation of the engine speed.

13 Claims, 4 Drawing Sheets

4,848,531

ELECTRONIC SYSTEM FOR MONITORING CLUTCH BRAKE ENGAGEMENT AND CLUTCH SLIPPAGE

BACKGROUND OF THE INVENTION

The present invention relates in general to vehicle clutches and in particular to a system for monitoring the rotational speeds of both a clutch brake and a flywheel within a friction clutch assembly and for generating a visual or audible indication when a predetermined condition occurs, such as frictional engagement of the clutch brake or slippage within the friction clutch assembly.

Manual transmissions are widely used in various types of vehicles. In such vehicles, a friction clutch assembly is generally utilized to selectively connect the vehicle engine to the vehicle transmission. The friction clutch assembly includes a plurality of driving input members (including a flywheel) which are connected to the engine, and a plurality of driven output members (including an output shaft) which are connected to the transmission. Means are provided for selectively frictionally engaging the driving input members to the driven output members. When so connected, the flywheel is connected to the output shaft for rotation together. Therefore, the engine is connected to the transmission for supplying power thereto. When the friction clutch assembly is disengaged, the transmission is not driven by the engine, and the transmission may be shifted smoothly from one gear ratio to another before re-engaging the friction clutch assembly.

A release mechanism is provided in the friction clutch assembly to accomplish the selective frictional engagement and disengagement thereof. Typically, the release mechanism includes a bearing which is disposed about the output shaft. The release bearing is axially movable along the output shaft between engaged and disengaged positions. In non-synchronized transmissions, it is well known to further provide a clutch brake about the output shaft to stop the output shaft from rotating when the release bearing is moved to the disengaged position. The clutch brake is disposed about the output shaft (to which it is connected for rotation therewith) between the release bearing and a housing for the friction clutch assembly. When the release bearing is moved to the disengaged position, the clutch brake is frictionally engaged between the release bearing and the housing. Such frictional engagement slows the rotation of the output shaft of the friction clutch assembly so that a smooth gear shifting operation may be effected within the transmission.

The clutch brake is intended to be used only for the limited purpose of stopping the rotation of the output shaft prior to a gear shifting operation. Therefore, the clutch brake should be frictionally engaged only for relatively short periods of time. Unfortunately, because of lengthy and unnecessary frictional engagement, known clutch brake structures are prone to premature wear and failure. Such excessive engagement is commonly referred to as "riding" the clutch brake during a gear shifting operation. Such a situation can occur if the clutch brake is frictionally engaged while upshifting or while the vehicle is rolling to a stop when the transmission is in gear. During such situations, the clutch brake is subjected to significant heat and mechanical loading resulting from the lengthy frictional engagement. Although some experienced vehicle operators can determine by feel when the clutch brake is applied and, therefore, are able to avoid such undesirable excessive frictional engagement, many other vehicle operators are not so skilled. Accordingly, it would be desirable to provide a monitoring system which alerts the vehicle operator when the clutch brake is frictionally engaged in order to prevent premature failure thereof resulting from excessive engagement. It would also be desirable to provide such a monitoring system which alerts the vehicle operator when an undesirable amount of slippage occurs within the friction clutch assembly when it is engaged, indicating that maintenance for the friction clutch assembly is needed.

SUMMARY OF THE INVENTION

The present invention relates to an electronic system for monitoring the operation of a vehicle friction clutch assembly and for generating a visual or audible indication when the clutch brake of the assembly is frictionally engaged. The system includes means for generating an electrical signal which is representative of the rotational speed of the clutch brake. In a first embodiment, such means for generating includes a plurality of magnets attached to the clutch brake. In a second embodiment, such means for generating includes a plurality of radially outwardly extending teeth formed on the clutch brake. In both embodiments, a sensor is disposed near the clutch brake which is responsive to the passage of the magnets and teeth rotating thereby. The sensor generates an electrical pulse train signal having a frequency which is proportional to the rotational speed of the clutch brake. An electronic control circuit is provided for generating a visual or audible indication when the value of the clutch brake rotational speed signal approaches zero, indicating that the clutch brake is frictionally engaged. A similar sensing means can be provided for determining the rotational speed of the flywheel of the friction clutch assembly. The control circuit compares the flywheel rotational speed signal with the clutch brake rotational speed signal and generates a visual or audible indication when the values of the two signals are not equal or when they differ by more than a predetermined amount. Such a situation would occur when there is slippage in the friction clutch assembly which requires maintenance. The flywheel rotational speed signal can also be displayed separately as an analog or digital representation of the engine speed.

It is an object of the present invention to provide an electronic system for monitoring the operation of a clutch brake and flywheel in a friction clutch assembly so as to alert a vehicle operator to the occurrence of predetermined conditions.

It is another object of the present invention to provide such a monitoring system which is simple and inexpensive to install and operate.

Other objects and advantages of the present invention will become apparent to those skilled in the art from the following detailed description of the preferred embodiments, when read in light of the accompanying drawings.

DETAILED DESCRIPTION OF THE PREFERRED EMBODIMENTS

Figure 1:
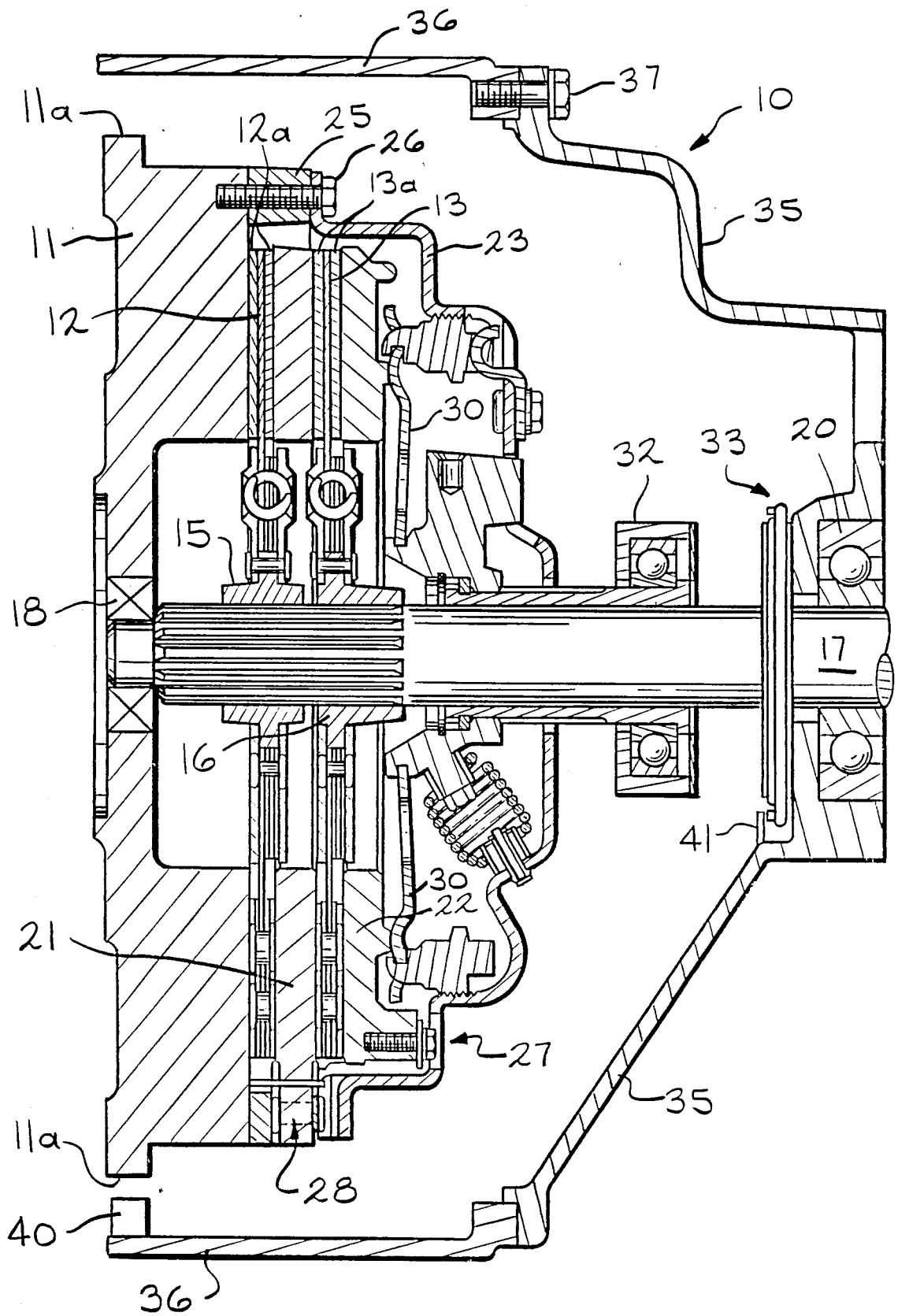
FIG. 1 is a sectional side elevational view of a friction clutch assembly including a monitoring system in accordance the present invention.

Referring now to the drawings, there is illustrated in FIG. 1 a multiple disc friction clutch assembly, indicated generally at 10, adapted for use in a vehicle. The clutch assembly 10 is conventional in the art and includes a flywheel 11 connected to a crankshaft (not shown) of an engine of the vehicle. Rotational movement of the crankshaft by the vehicle engine, therefore, causes corresponding rotational movement of the flywheel 11. A plurality of tooth-like projections 11a are provided about the outer periphery of the flywheel 11. The projections 11a extend radially outwardly from the flywheel 11 and form a portion of a means for generating an electrical signal representing the rotational speed of the flywheel 11, as will be described in detail below.

The friction clutch assembly 10 further includes forward and rearward annular clutch discs 12 and 13, respectively. Each of the clutch discs 12 and 13 includes one or more pairs of friction facings 12a and 13a respectively, attached to the opposed faces thereof. The clutch discs 12 and 13 are connected to respective hubs 15 and 16 for rotation therewith. The hubs 15 and 16 are splined onto an output shaft 17 and are axially movable thereon. The output shaft 17 is piloted at its forward end in a bearing 18 retained in the flywheel 11. The rearward end of the output shaft 17 is supported in a bearing 20 located at the forward end of the vehicle transmission (not shown). As is well known, the output shaft 17 is connected to one or more input gears (not shown) disposed within the transmission for supplying power from the engine through the friction clutch assembly 10 to the transmission.

An intermediate plate 21 and a pressure plate 22 are rotatably and co-axially supported about the output shaft 17. The intermediate plate 21 is disposed between the forward and rearward clutch discs 12 and 13, respectively, while the pressure plate 22 is disposed rearwardly of the rearward clutch disc 13. A clutch cover 23 is attached to the flywheel 11 through an adapter or spacer ring 25 by a plurality of threaded fasteners 26 (only one is illustrated) or any other suitable means. A first plurality of drive strap assemblies, one of which is indicated generally at 27, is provided to connect the clutch cover 23 to the pressure plate 22 for rotation therewith. Similarly, a second plurality of drive strap assemblies, one of which is indicated generally at 28, is provided to connect the clutch cover 23 to the intermediate plate 21 for rotation therewith. Thus, it can be seen that the flywheel 11, the spacer ring 25, the clutch cover 23, the pressure plate 22, and the intermediate plate 21 (the driving components) all rotate together as a unit, while the forward and rearward clutch discs 12 and 13 and the output shaft 17 (the driven components) all rotate together as a separate unit.

A plurality of radially extending clutch levers 30 are disposed about the output shaft 17 to provide, in a known manner, a means for selective frictional engagement and disengagement of the forward and rearward clutch discs 12 and 13 by the flywheel 11, the intermediate plate 21, and the pressure plate 22. A plurality of return springs 31 (only one is illustrated) cooperate with a release bearing 32 in a conventional manner for providing such engaging and disengaging movement of the clutch levers 30, as will be readily understood by those skilled in the art. In general, however, the release bearing 32 is moved toward the flywheel 11 to cause the frictional engagement of the clutch discs 12 and 13, and is moved away from the flywheel 11 to release such frictional engagement. The structure of the friction clutch assembly 10 thus far described is conventional in the art.

Figure 2:
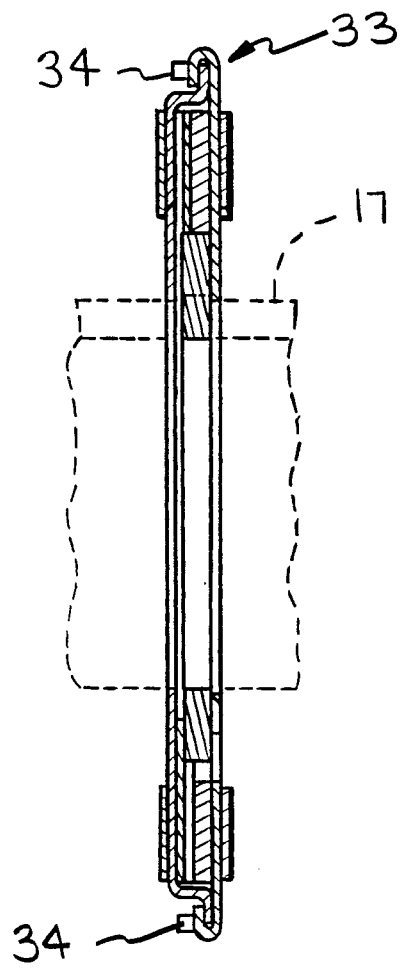
FIG. 2 is an enlarged sectional side elevational view of a first embodiment of a clutch brake adapted for use in the friction clutch assembly illustrated in FIG. 1.
Figure 3:
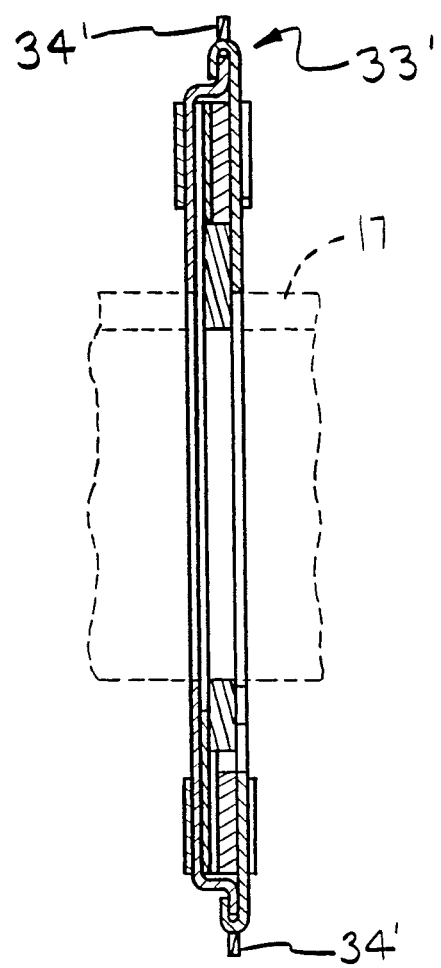
FIG. 3 is enlarged sectional side elevational view of a second embodiment of a clutch brake adapted for use in the assembly illustrated in FIG. 1.

A clutch brake, indicated generally at 33, is splined onto the output shaft 17 for rotation therewith. The general structure and operation of the clutch brake 33 are described in detail in U.S. Pat. Nos. 3,763,977 to Sink and 4,657,124 to Flotow, both owned by the assignee of the present invention. The disclosures of these two patents are incorporated herein by reference. As shown in FIG. 2, the basic structure of the clutch brake 33 is conventional. However, a plurality of relatively small magnets 34 (only two are illustrated) are attached to the outer peripheral edge of the clutch brake 33. The magnets 34 are spaced equidistantly about such outer peripheral edge. Although any convenient number of such magnets 34 may be utilized, it has been found that two of such magnets 34 function satisfactorily to generate an electrical signal representing the rotational speed of the clutch brake 33, as will be described in detail below. FIG. 3 illustrates an alternate embodiment of the clutch brake, indicated generally at 33', wherein a plurality of relatively small metallic tangs 34' (only two are illustrated) are formed integrally with one of the components of the clutch brake 33'. The number and spacing of the tangs 34' can be the same as that described above in connection with the magnets 34.

A bell housing 35 encloses the rearward end of the friction clutch assembly 10. The bell housing 35 is secured to a rearward extension 36 of an engine block (not shown) of the vehicle by any suitable means, such as by a plurality of bolts 37 (only one is illustrated) spaced about the periphery of the bell housing 35. A first sensor 40 is attached to the inner surface of the rearward extension 36. The first sensor 40 is disposed adjacent to the outer peripheral edge of the flywheel 11. As the flywheel 11 is rotated by the vehicle engine, the flywheel projections 11a are moved past the stationary first sensor 40. In a similar manner, a second sensor 41 is attached to the inner surface of the bell housing 35. The second sensor 41 is disposed adjacent to the outer peripheral edge of the clutch brake 33. Thus, as the clutch brake 33 is rotated by the vehicle engine (when the friction clutch assembly 10 is engaged), the clutch brake magnets 34 or tangs 34' are moved past the stationary second sensor 41. The first and second sensors 40 and 41 are conventional magnetic pick-up or similar devices which are responsive to the movement of a magnetic or ferrous material thereby for generating an electrical signal related to such movement.

Figure 4:
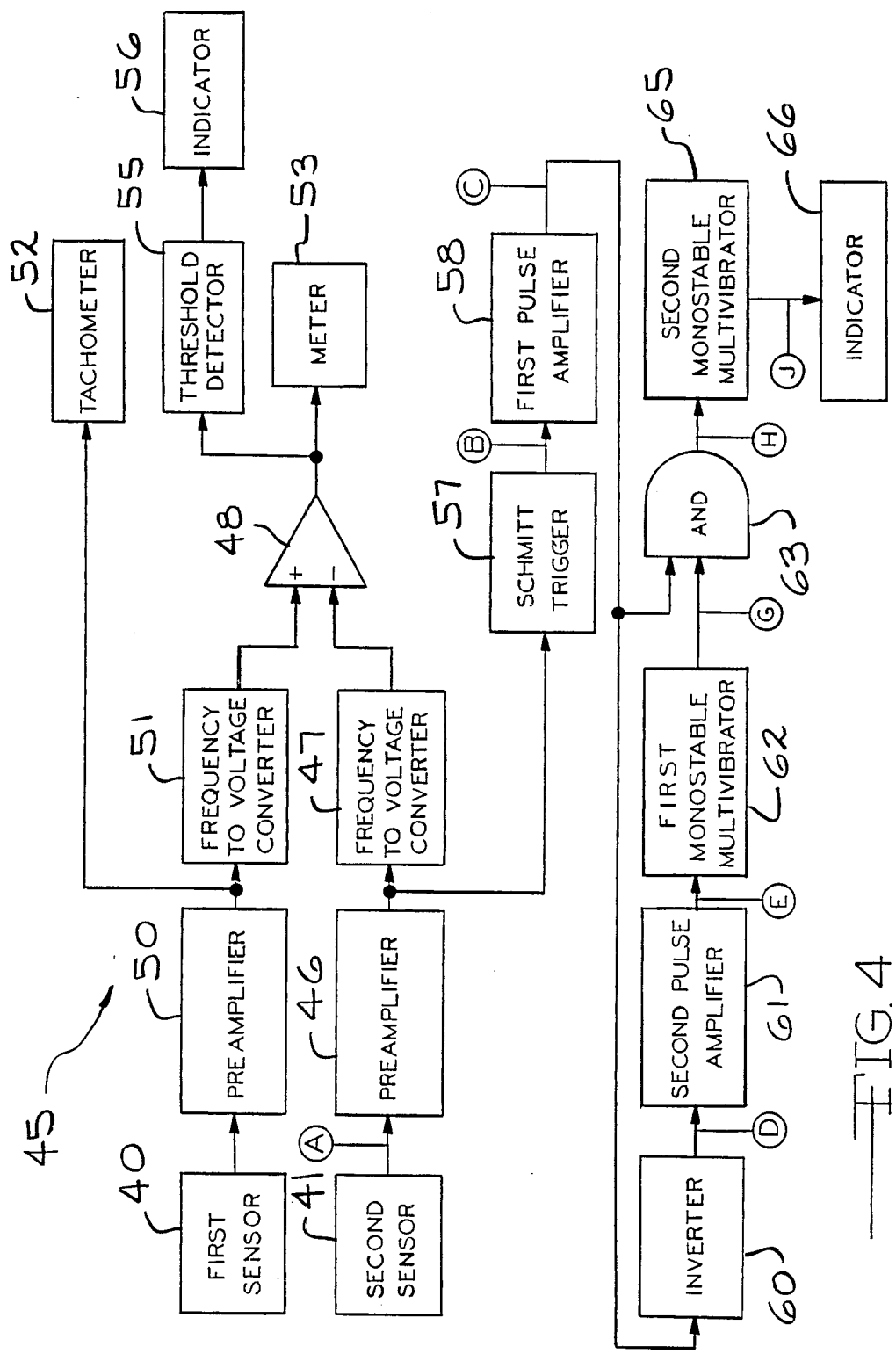
FIG. 4 is a block diagram of an electronic control circuit for the monitoring system of the present invention.

Referring now to FIG. 4, there is illustrated a block diagram of an electronic control circuit, indicated generally at 45, for monitoring the operation of the friction clutch assembly 10. FIGS. 5A through 5J and FIGS. 6A through 6J are wave form diagrams which schematically illustrate electrical signals generated by various components of the control circuit 45 at the points indicated by the corresponding capital letters illustrated in FIG. 4. FIGS. 5A through 5J illustrate electrical signals which are generated when the rotational speed of the clutch brake 33 is less than a predetermined speed, while FIGS. 6A through 6J illustrate electrical signals which are generated when the rotational speed of the clutch brake 33 is greater than the predetermined speed, as will be described in detail below.

Figure 5A:
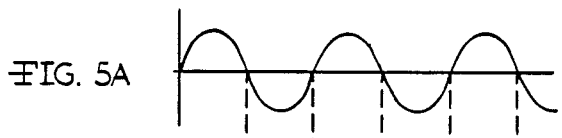
FIGS. 5A through 5J are is a series of wave form diagrams showing various electrical signals generated within the electronic control system illustrated in FIG. 4 when the rotational speed of the clutch brake is less than a predetermined threshold level.
Figure 6A:
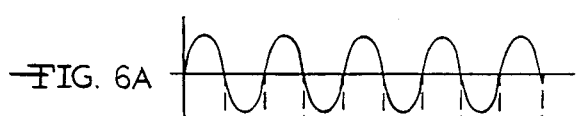
FIGS. 6A through 6J are a series of wave form diagrams similar to FIGS. 5A through 5J showing the various electrical signals generated within the electronic control system illustrated in FIG. 4 when the rotational speed of the clutch brake is greater than the predetermined threshold level.

As shown in both FIGS. 5A and 6A, the output signal from the second sensor 41 is a generally sinusoidal wave form having a period which is proportional to the rotational speed of the clutch brake 33. When the rotational speed of the clutch brake 33 is relatively slow, the period of the sinusoidal wave form generated by the second sensor 41 is relatively long, as shown in FIG. 5A. When the rotational speed of the clutch brake 33 is relatively fast, however, the period of the sinusoidal wave form generated by the second sensor 41 is relatively short, as shown in FIG. 6A. The output signal from the first sensor 40 (not shown) is also a generally sinusoidal wave form which is similar in appearance to the output signal from the second sensor 41. However, the frequency of the output signal from the first sensor 40 is, of course, related to the rotational speed of the flywheel 11 and, therefore, to the rotational speed of the vehicle engine.

The output signal from the second sensor 41 is fed through a preamplifier 46 to a frequency to voltage converter 47. The frequency to voltage converter 47 is conventional in the art and generates an output signal having a voltage which is proportional to the frequency of the output signal from the second sensor 41. The output signal from the converter 47 is fed to a first input of a differential amplifier 48. Similarly, the output signal from the first sensor 40 is fed through a preamplifier 50 to a frequency to voltage converter 51. The output signal from the converter 51 is fed to a second input of the differential amplifier 48. The output signal from the preamplifier 50 is also fed to a tachometer 52. The tachometer 52 is conventional in the art and includes means for generating a visual indication or display of the rotational speed of the flywheel 11 (and, hence, of the vehicle engine) in response to the output signal from the preamplifier 50.

The differential amplifier 48 is also conventional in the art and generates an output signal which is representative of the difference between the voltage levels of the inputs signals from the first and second sensors 40 and 41. Thus, the voltage level of the output signal from the differential amplifier 48 is representative of the difference between the rotational speeds of the flywheel 11 and the clutch brake 33. Ideally, such rotational speeds are equal when the friction clutch assembly 10 is engaged, thereby indicating that there is no slippage between the driving and driven components. However, when wear occurs from usage of the friction clutch assembly 10, or when some abnormal condition occurs, the partial loss of the frictional engagement of the driven components by the driving components will cause the flywheel 11 to rotate faster than the clutch brake 33. The magnitude of that relative difference in rotational speeds is reflected in the output signal from the differential amplifier 48.

The output signal from the differential amplifier 48 is fed to a meter 53 and to a threshold detector 55. The meter 53 provides a continuous visual indication of the magnitude of the rotational speed differential between the flywheel 11 and the clutch brake 33. The threshold detector 55 generates an output signal to an indicator 56 whenever the magnitude of the output signal from the differential amplifier 48 exceeds a predetermined value. Thus, the indicator 56 is activated only when the amount of slippage within the friction clutch assembly 10 is greater than the predetermined value. The structure and operation of the meter 53 and the threshold detector 55 are conventional in the art. Thus, the control circuit 45 monitors the operation of the friction clutch assembly 10 and generates a first indication of the amount of slippage occurring therein during use and a second indication when the amount of such slippage exceeds a predetermined value.

The control circuit 45 also provides an indication when the rotational speed of the clutch brake 33 is less than a predetermined speed. Typically, this predetermined speed is relatively close to zero rotational speed. The clutch brake 33 would normally approach such zero rotational speed only when it is frictionally engaged between the release bearing 32 and the rearward end of the bell housing 35. At other times, the rotational speed of the clutch brake 33 is greater than this predetermined speed For example, the rotational speed of the clutch brake 33 will obviously be relatively fast when the friction clutch assembly 10 is engaged, since the vehicle engine is connected to rotate the output shaft 17. The rotational speed of the output shaft 17 will continue to rotate at a relatively fast speed even after the friction clutch assembly 10 has been disengaged, because the momentum of the components in the transmission will tend to keep them rotating for a period of time after the clutch assembly 10 has been disengaged. Generally, therefore, the rotational speed of the clutch brake 33 will fall below the predetermined speed only when the rotation thereof has been affirmatively stopped by the frictional engagement of the clutch brake 33.

Figure 5B:
Figure 6B:
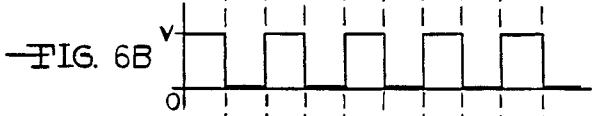

In order to determine when the rotational speed of the clutch brake 33 falls below the predetermined speed, the output signal from the preamplifier 46 is also fed to the input of a Schmitt trigger circuit 57. The Schmitt trigger circuit 57 is conventional in the art and generates a square wave output signal, as shown in FIGS. 5B and 6B. The square wave output signal moves from approximately zero volts to a positive voltage when the sinusoidal wave form from the preamplifier 46 is positive, and moves back to approximately zero volts when the sinusoidal wave form is negative. The period of the output signal from the Schmitt trigger circuit 57 is equal to the period of the output signal from the second sensor 41 and, therefore, is representative of the rotational speed of the clutch brake 33.

Figure 5C:
Figure 6C:

The output signal from the Schmitt trigger circuit 57 is fed to a first pulse amplifier circuit 58. The first pulse amplifier circuit 58 is conventional in the art and is responsive to the positive moving edge (in this case, the leading edge) of each of the output pulses from the Schmitt trigger circuit 57 for initiating the generation of a positive output pulse. However, each of the output pulses generated by the first pulse amplifier 58 is relatively short in time duration. As shown in FIGS. 5C and 6C, the period between adjacent output pulses from the first pulse amplifier 58 is the same as the period between adjacent output pulses from the Schmitt trigger circuit 57.

Figure 5D:
Figure 5E:
Figure 6D:
Figure 6E:
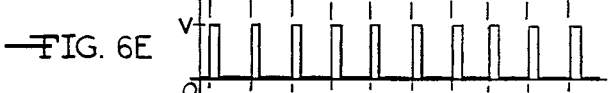

The output signals from the first pulse amplifier 58 are fed through an inverter circuit 60 to a second pulse amplifier circuit 61. The inverter circuit 60 inverts the polarity of the output pulses generated by the first pulse amplifier circuit 58, as shown in FIGS. 5D and 6D. The second pulse amplifier circuit 61 is responsive to the positive moving edge (in this case, the trailing edge) of each of the output pulses from the inverter circuit 60 for initiating the generation of a positive output pulse, as shown in FIGS. 5E and 6E. Each of the output pulses generated by the second pulse amplifier 58 is also relatively short in time duration. Thus, it can be seen that the combination of the inverter circuit 60 and the second pulse amplifier 61 provide a means for generating a pulse train which is similar in appearance to the output pulse train generated by the first pulse amplifier 58, but which is delayed in time by a certain amount.

The output pulses from the second pulse amplifier 61 are fed to the input to a first monostable multivibrator circuit 62. The first monostable multivibrator circuit 62 is responsive to the positive moving edge (in this case, the leading edge) of each of the pulses generated by the second pulse amplifier 61 for generating an output pulse at a positive voltage having a predetermined time duration. As is well known in the art, the first monostable multivibrator circuit 62 includes an internal timing circuit (not shown), which typically includes an interacting combination of a resistor and a capacitor. The values of the resistor and the capacitor determine the length of the time duration of the output pulses generated by the first monostable multivibrator circuit 62.

Figure 5F:
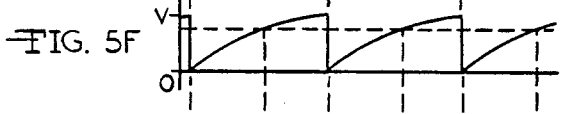
Figure 5G:
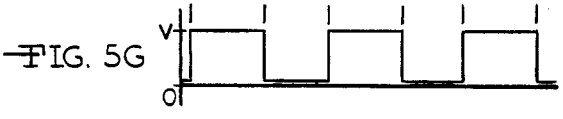
Figure 6F:
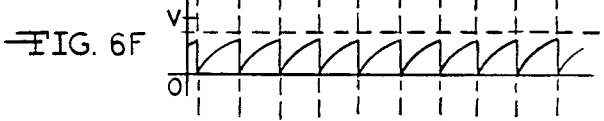

Once the generation of an output pulse is initiated, the internal timing circuit of the first monostable multivibrator circuit 62 is reset to zero and begins to re-charge according to an exponential rate determined by the values of the resistor and the capacitor, as shown in FIGS. 5F and 6F. If the internal re-charging level crosses above a predetermined threshold level (indicated by the dotted lines in FIGS. 5F and 6F), the output signal from the first monostable multivibrator circuit 62 is reset to approximately zero volts, as shown in FIG. 5G. In order for this to occur, the output pulses from the second pulse amplifier 61 must be spaced apart in time by an amount which is greater than the re-charging time constant of the first monostable multivibrator circuit 62. In other words, the rotational speed of the clutch brake 33 must be slower than a predetermined speed. Thus, when this condition occurs, the output signal from the first monostable multivibrator circuit 62 will oscillate between approximately zero volts and a positive voltage. Those portions of the output signal from the first monostable multivibrator circuit 62 at a positive voltage have uniform time durations based upon the values of the internal resistor and the capacitor. The period of the output signal from the first monostable multivibrator circuit 62 is equal to the period of the output signal from the second sensor 41.

Figure 6G:
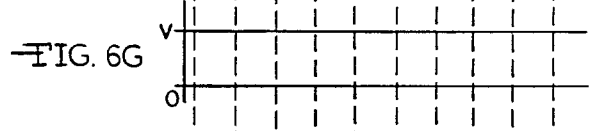

If the rotational speed of the clutch brake 33 is faster than the predetermined speed, however, the internal re-charging of the first monostable multivibrator circuit 62 will be repeatedly reset to zero before it crosses above the threshold level. In other words, the internal re-charging of the first monostable multivibrator circuit 62 will not occur at a fast enough rate to permit it to cross above the threshold level indicated by the dotted line in FIG. 6F. As a result, the output signal from the first monostable multivibrator circuit 62 is not reset to approximately zero volts and, consequently, remains at a positive voltage, as shown in FIG. 6G. By varying the values of the resistor and the capacitor in the first monostable multivibrator circuit 62, the re-charging rate (and, hence, the value of the predetermined speed) can be adjusted to a desired value. As mentioned above, this predetermined speed is generally set to represent a relatively slow rotational speed of the clutch brake 33.

Figure 5H:
Figure 6H:

The output signal from the first monostable multivibrator circuit 62 is fed to a first input of an AND gate 63. The output from the first pulse amplifier 58 is fed to a second input of the AND gate 63. The AND gate 63 generates a positive voltage output only when both of the inputs thereto are simultaneously positive. When the rotational speed of the clutch brake 33 is less than the predetermined speed, the output signal from the AND gate 63 is always zero, as shown in FIG. 5H. This occurs as a result of the time delay generated by the combination of the inverter 60 and the second pulse amplifier 61. Because of such time delay, the output pulses from the first pulse amplifier 58 and the first monostable multivibrator circuit 62 never occur at the same time. Thus, the output signal from the AND gate 63 is always zero. When the rotational speed of the clutch brake 33 is greater than the predetermined speed, however, the first input to the AND gate 63 is always a positive voltage, as described above. Therefore, the output signal from the AND gate 63 follows the output signal from the first pulse amplifier 58, as shown in FIG. 6H, when the rotational speed of the clutch brake 33 is greater than the predetermined speed.

Figure 5I:
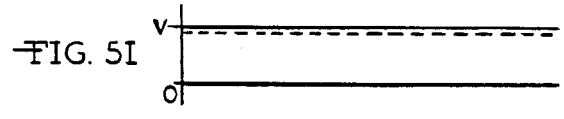
Figure 5J:

The output signal from the AND gate 63 is fed to the input of a second monostable multivibrator circuit 65. When the output signal from the AND gate 63 is maintained at approximately zero volts (such as would occur when the rotational speed of the clutch brake is less than the predetermined speed), no triggering pulses are fed to the second monostable multivibrator circuit 65. Thus, the internal re-charging of the second monostable multivibrator circuit 65 is never reset to zero, as shown in FIG. 5I. Therefore, the output signal from the second monostable multivibrator circuit 65 remains at approximately zero volts, as shown in FIG. 5J.

Figure 6I:
Figure 6J:
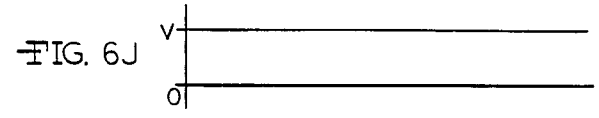

When the output signal from the AND gate 63 is a pulse train signal (such as would occur when the rotational speed of the clutch brake is greater than the predetermined speed), a series of triggering pulses are fed to the second monostable multivibrator circuit 65. As shown in FIG. 6I, the internal re-charging of the second monostable multivibrator circuit 65 is repeatedly reset to zero. Such resetting occurs at a rate which is faster than the time which is necessary for the internal re-charging of the second monostable multivibrator 65 to cross above the threshold level, as indicated by the dotted line in FIG. 6I. Thus, the output signal from the second monostable multivibrator circuit 65 remains at a positive voltage, as shown in FIG. 6J.

The output signal from the second monostable multivibrator circuit 65 is fed to an indicator 66, which is energized when a zero output signal is generated by the second monostable multivibrator circuit 65. Thus, it can be seen that the indicator 66 will be energized only when the rotational speed of the clutch brake 33 is less than the predetermined speed. As mentioned above, such a condition will generally occur only when the clutch brake 33 is frictionally engaged. The indicator 66 can provide a visual or audible indication to the operator of the vehicle of the occurrence of such frictional engagement. In this manner, the vehicle operator will be alerted as to when the clutch brake 33 is frictionally engaged and will be reminded to release such engagement before an undue period of time has elapsed.

In accordance with the provisions of the patent statutes, the principle and mode of operation of the present invention have been explained and illustrated in its preferred embodiments. However, it must be understood that the present invention may be practiced otherwise than as specifically explained and illustrated without departing from its spirit or scope.

What is claimed is:

1. In a friction clutch assembly including a rotatable input member, a rotatable output member, means for selectively connecting the input member to the output member for rotation therewith, and clutch brake means connected for rotation with the output member for selectively slowing the rotational speed of the output member, a system for generating an indication when the rotational speed of the clutch brake means is less than a predetermined minimum rotational speed comprising:

means for generating a signal which is representative of the rotational speed of the clutch brake means;

means for generating a signal which is representative of the predetermined minimum rotational speed; and means responsive to said clutch brake means rotational speed signal and said predetermined minimum rotational speed signal for generating an indication when said clutch brake means rotational speed is less than said predetermined minimum rotational speed.

2. The invention defined in claim 1 wherein said means for generating a signal which is representative of the rotational speed of the clutch brake means generates an electrical signal at a frequency which is proportional to the rotational speed of the clutch brake means.

3. The invention defined in claim 2 further including first pulse amplifier means responsive to said electrical signal for generating first output pulses at a frequency which is proportional to the frequency of said electrical signal, each of said first output pulses having a predetermined time duration.

4. The invention defined in claim 3 further including means responsive to said first output pulses for generating second output pulses, each of said second output pulses having a predetermined time duration, the beginning of each of said second output pulses being delayed in time from the beginning of each of said first output pulses by a predetermined amount.

5. The invention defined in claim 4 wherein said means for generating said second output pulses includes inverter means for inverting the magnitude of said first output pulses means and second pulse amplifier means connected to said inverter means, said second pulse amplifier means being responsive to the termination of said inverted first output pulses for generating said second output pulses.

6. The invention defined in claim 5 further including first monostable multivibrator means responsive to said second output pulses for generating an output signal, said output signal being a continuous output signal when the clutch brake means is rotating faster than said minimum rotational speed of the clutch brake means and being a pulsating output signal when the clutch brake means is rotating slower than said minimum rotational speed of the clutch brake means.

7. The invention defined in claim 6 wherein said first monostable multivibrator means defines an internal re-charging rate which is proportional to said predetermined minimum rotational speed of the clutch brake means, said output signal being a continuous output signal when said second pulses are generated at a rate which is faster than said re-charging rate and generates a pulsating output signal when said second pulses are generated at a rate which is slower than said re-charging rate.

8. The invention defined in claim 6 further including gate means for generating an output signal when said first output pulses from said first pulse amplifier means and said output signal from said first monostable multivibrator means are generated simultaneously.

9. The invention defined in claim 8 further including second monostable multivibrator means responsive to said gate means output signal for generating an output signal, said output signal being a continuous first output signal when the clutch brake means is rotating faster than said minimum rotational speed of the clutch brake means and being a continuous second output signal when the clutch brake means is rotating slower than said minimum rotational speed of the clutch brake means.

10. The invention defined in claim 9 wherein said second monostable multivibrator means defines an internal re-charging rate which is proportional to said predetermined minimum rotational speed of the clutch brake means.

11. A friction clutch assembly comprising:

a housing;

a rotatable input member;

a rotatable output member;

means for selectively connecting said input member to said output member for rotation therewith including a movable release bearing;

clutch brake means connected for rotation with the output member and axially movable therealong, said clutch brake means adapted to be selectively frictionally engaged between said housing and said release bearing;

means for generating a signal which is representative of the rotational speed of said clutch brake means;

means for generating a signal which is representative of a predetermined rotational speed for said clutch brake means; and means responsive to said clutch brake means rotational speed signal and said predetermined rotational speed signal for generating an indication when said clutch brake means rotational speed is less than said predetermined rotational speed.

12. The invention defined in claim 11 wherein said means for generating a signal which is representative of the rotational speed of the clutch brake means includes a plurality of projections formed on the clutch brake means and sensor means disposed in the clutch assembly responsive to passage of said projections thereby when the clutch brake means is rotated for generating an electrical signal which is representative of the rotational speed of the clutch brake means.

13. The invention defined in claim 11 wherein said means for generating a signal which is representative of the rotational speed of the clutch brake means includes a plurality of magnets secured to the clutch brake means and sensor means disposed in the clutch assembly responsive to passage of said magnets thereby when the clutch brake means is rotated for generating an electrical signal which is representative of the rotational speed of the clutch brake means.

* * * * *